2 Sheets--Sheet 1.

JOHN TURNER.

Improvement in Machines for Covering Cord.

No. 4,649. Reissued Nov. 28, 1871.

Witnesses.
Fred Haimer
R. B. Babcock

John Turner

AM. PHOTO-LITHOGRAPHIC CO. N.Y. (OSBORNE'S PROCESS.)

JOHN TURNER.

Improvement in Machines for Covering Cord.

No. 4,649. Reissued Nov. 28, 1871.

Witnesses.

Fred Haynes

R. R. Rabian

John Turner

AM. PHOTO-LITHOGRAPHIC CO. N.Y. (OSBORNE'S PROCESS.)

UNITED STATES PATENT OFFICE.

JOHN TURNER, OF NORWICH, AND ISAAC E. PALMER, OF MONTVILLE, CONNECTICUT; SAID PALMER ASSIGNOR TO SAID TURNER.

IMPROVEMENT IN MACHINES FOR COVERING CORDS.

Specification forming part of Letters Patent No. 38,190, dated April 14, 1863; reissue No. 3,345, dated March 30, 1869; reissue No. 4,649, dated November 28, 1871.

*To all whom it may concern:*

Be it known that the following is a full, clear, and exact description of an Improvement in Machinery for Manufacturing Covered Twist and Cord; invented by JOHN TURNER, of Norwich, in the county of New London and State of Connecticut, and ISAAC E. PALMER, of Montville, same county and State, reference being had to the accompanying drawing forming part of this specification, and in which—

Figure 1:
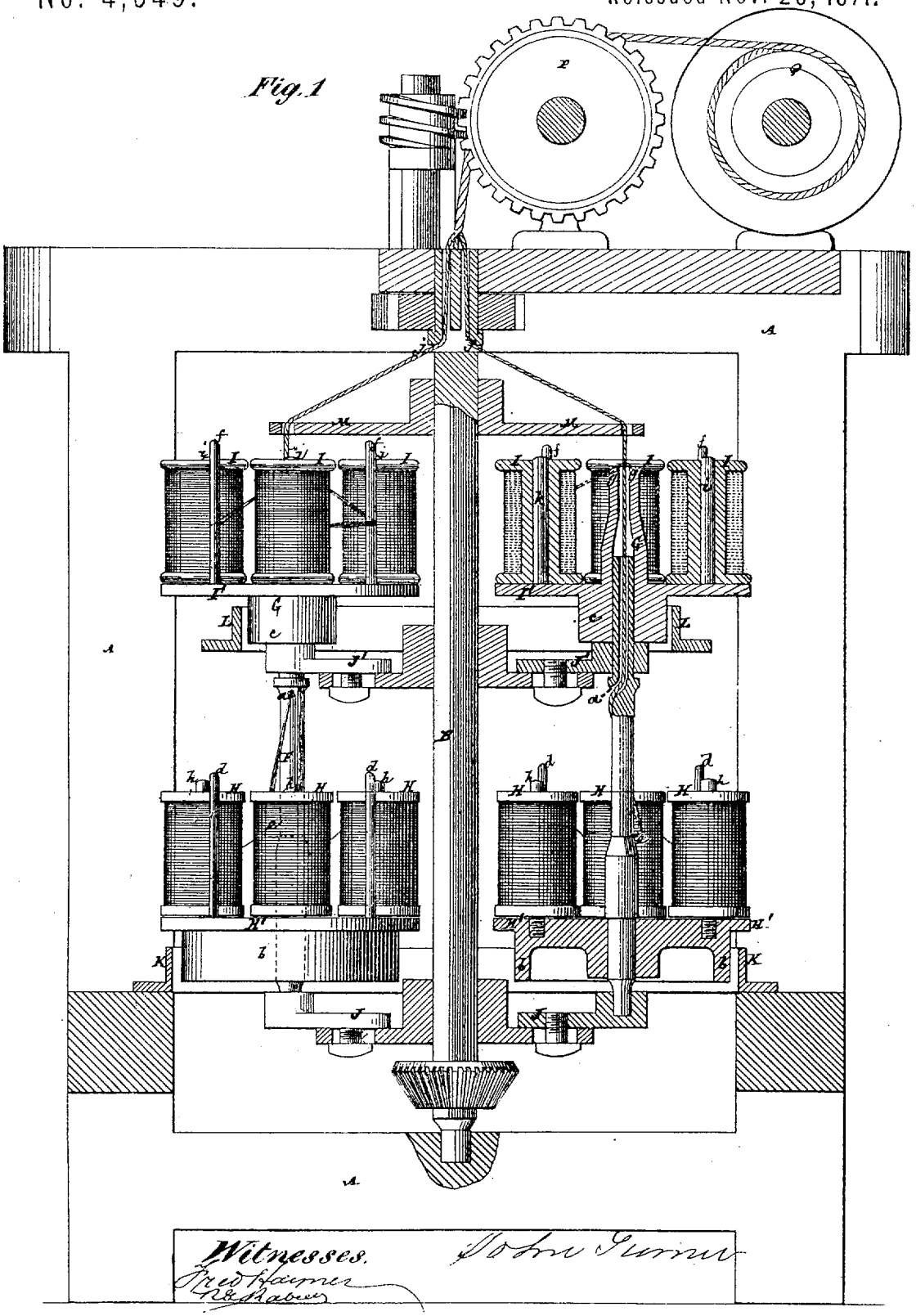
Figure 3:
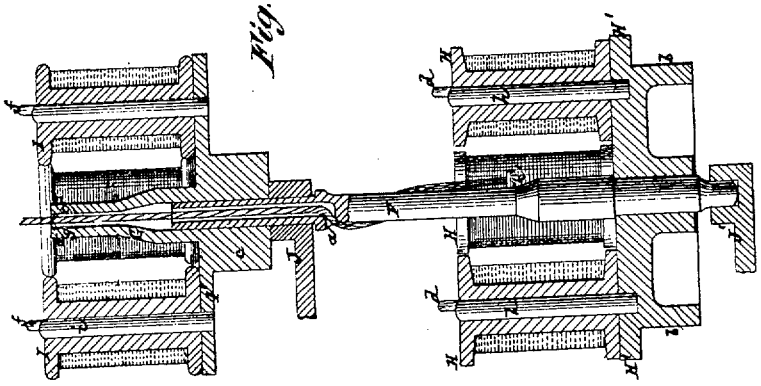
Figure 4:
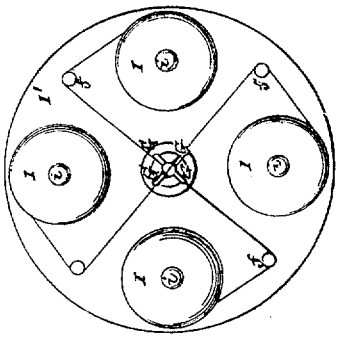
Figure 2:
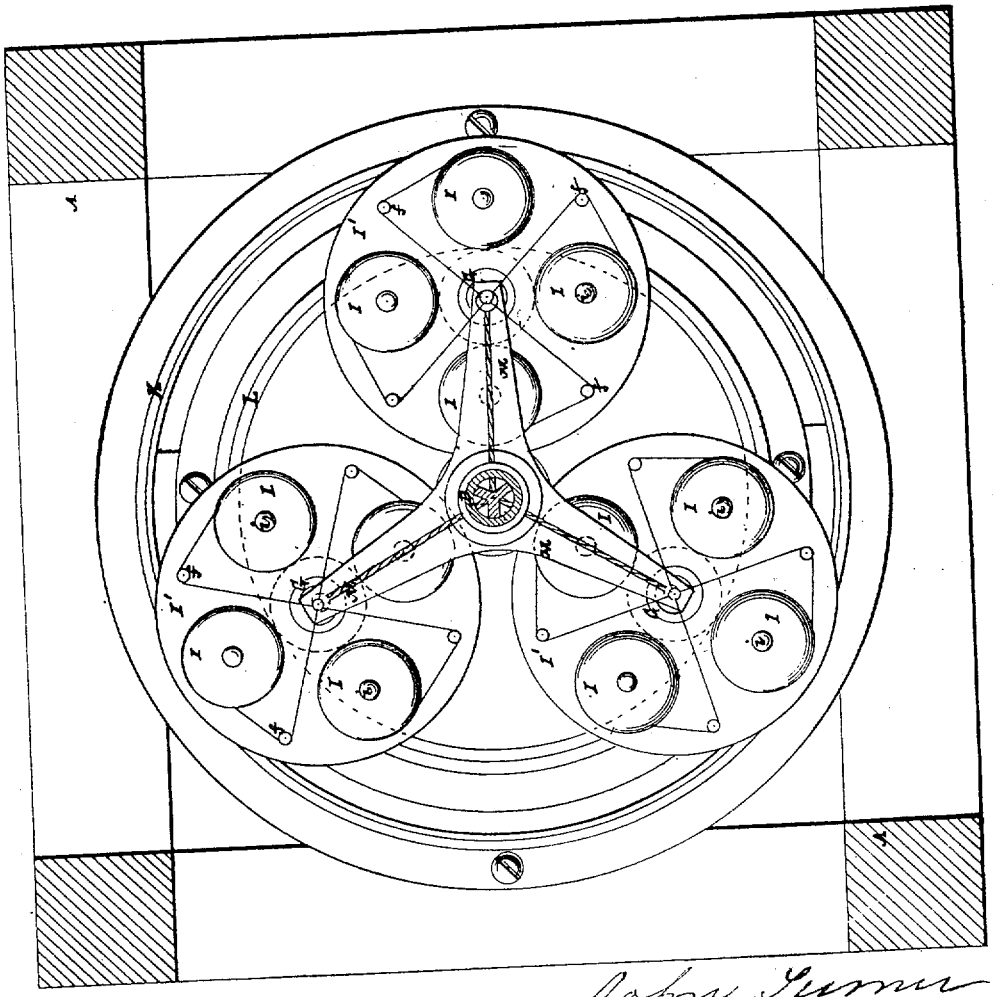

Figure 1 represents a vertical section of a machine for making covered cord. Fig. 2 is a horizontal section of the same above the upper series of bobbins. Fig. 3 is a sectional elevation of one of the strand-spindles with covering device combined; and Fig. 4, a top view of the same.

Similar letters of reference indicate corresponding parts throughout the several figures.

This invention consists in a novel combination and arrangement of mechanism for producing covered twist or cord, said combination embracing a laying-up mechanism, two or more strand-twisting spindles, and a like number of covering devices for covering the several strands before being laid together, the covering devices being arranged to rotate independently of the spindles that twist the several strands.

A, in the accompanying drawing, represents the frame of the machine, having arranged within it an upright main rotating spindle, B, and in its lower part a horizontal shaft, from which said spindle derives a rotary motion through a pair of bevel-gears. F F and G G are the strand-spindles, of which there may be any number in excess of one, the same being carried by or operated in connection with, and arranged parallel to and at equal distances apart, from the main spindle B. The lower ones, F F, of these spindles, carry the bobbins H H, which supply the yarn or thread to make the body of the twist of which the strands are to be composed; and the upper ones, G G, carry the bobbins I I, which supply the covering-yarn or thread. The lower spindles F F are shown as fitted to bearings in arms J J and J′ J′, which are firmly secured to the main spindle B, while the upper spindles G G, which are made hollow, may be fitted to rotate upon the upper parts of their respective spindles F F, and supported by the upper arms J′ J′ of the main shaft. The upper part of the spindles F F are also hollow down to a point below the arms J′ J′, and an opening, *a*, leading into the interior of the said hollow portion of each, is provided through the side of the spindle. The several bobbins H are shown as fitted to turn easily upon upright spindles *h*, secured in disks H′ H′, which are fast upon their respective spindles F F, and the several bobbins I I are fitted to turn easily upon spindles *i i* secured in disks I′ I′, provided upon their respective spindles G G. The lower portions *b b* of the disks H′ may, if desired, be made in the form of pulleys to work in contact with the inner periphery of a fixed ring, K, secured to the framing, and for the purpose of obtaining a rotary motion of the spindles F F on their respective axes through the agency of the friction produced between the said portions *b b* against the said ring, in the revolutions of the spindles F F about the axes of the main spindle B; also, the lower portions of the spindles G G may be made with pulley-like hubs *c c*, to work in contact with the inner periphery of a fixed ring, L, in the same manner as *b b* work in contact with K, for the purpose of producing the rotation of the spindles G on their respective axes in an opposite direction to the rotary motion of the main spindle, by the planetary revolution about the axes of the spindle. The outer peripheries of *c c* and *b b*, or the inner peripheries of K and L may be faced with leather, India rubber, or other material, by which a suitable degree of friction to produce the rotation of the strand-spindles on their respective axes may be obtained. Of course, gear of any suitable kind may be substituted for the frictional arrangement or devices described, to give to the strand-spindles F and G their specified motions. The rotation of the spindles G G is here shown to be in the same direction as that of F F, but independently of the latter and the spindles G G, as rotating at a higher velocity than F F, which difference in speed may be accomplished by the relative proportions between *b b* and K, and between *c c* and L, as shown. *d d* are guide-pins, secured in the disks H H′, for conducting the several yarns or threads from the bobbins H H of each strand-spindle F to an eye, *e*, provided on one side of the spindle, the said eye conducting them to the opening *a*. *f f* are guide-pins secured in the disks I′ I′ for conducting the several yarns or threads from the bobbins I I to openings *g g* provided in the upper parts of the spindle G. M M is a number of arms, corresponding with the number of spindles F F and of those G G firmly secured to the main spindle B above the spindles G G, and containing holes to guide the several strands from the latter spindle to the holes *j j*, which are here shown as provided in the upper part of the spindle B, to constitute what is termed in cordage-machines the laying-top. P Q is an apparatus arranged on the top of the frame A, for taking up the cord as fast as it is made. This is substantially like the apparatus commonly used in rope-machines for taking up the finished rope, and derives motion through gearing from the main spindle B.

On setting the machine in operation, the spindles F F twist together the yarns from the bobbins H H, the said yarns passing through the spindles G G as well as through the upper parts of F F, and the twist taking place between the openings *a a* and the holes in the arms M M; and just before their twist is quite completed, or thereabout, the strands receive the yarns from the bobbins I I; and owing to the increased velocity of the spindles G G as compared with F F, the said yarns are wound upon and made to cover the exterior of the strands before the latter pass the guide-arms M M, which conduct them to the laying-top, to be twisted together between the said top and the take-up apparatus, by the rotary motion of the main spindle. The machine represented in Figs. 1 and 2 has three sets of strand-spindles and bobbins for making three-strand cord; but the number of sets may be varied to make cord with a different number of strands. There is the same number of devices for covering the several strands as there are spindles for twisting the strands. The covered twist and cord may be produced by making the upper spindles G G rotate in an opposite direction to the spindles F F, which mode of operation is embraced in this invention; and the means for accomplishing such reversed driving action needs no description here, as the same under different modifications will readily suggest themselves to any mechanic of ordinary skill familiar with machinery for the manufacture of twist or cord. Instead of the hollow spindles G G being arranged to rotate upon F F, they may be entirely separated from them. By the divided arrangement of the holes or openings *g g* in the upper part of the spindles G, and which holes in each spindle should lie in the same horizontal line or plane, the covering-cords, as passed or received from the several guiding-pins *f f*, are prevented from fouling, and regularity and smoothness insured in the laying of the covering.

What is claimed as the invention of JOHN TURNER and ISAAC E. PALMER, and desired to be secured by Letters Patent, is—

The combination of a laying-up mechanism, two or more twisting-spindles for twisting the several strands, and a corresponding number of covering devices for covering the several strands before being laid together, when the covering devices rotate independently of the twisting-spindles.

Witnesses: JOHN TURNER.

FRED. HAYNES,
R. E. RABEAU. (17)